April 26, 1966  R. A. POWELL ETAL  3,248,183
HIGH PRESSURE HIGH TEMPERATURE FILTER
Filed April 17, 1964
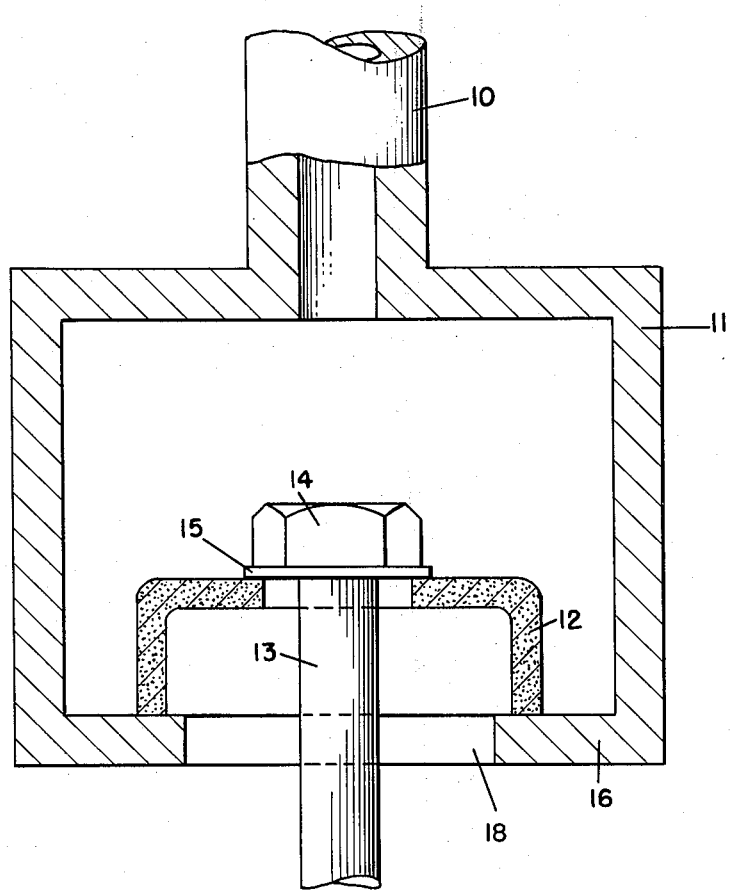
INVENTORS.
ROBERT A. POWELL
FRANK I. ZALESKI
BY
ATTORNEYS.

3,248,183
HIGH PRESSURE HIGH TEMPERATURE FILTER
Robert A. Powell and Frank I. Zaleski, Philadelphia, Pa., assignors to the United States of America as represented by the Secretary of the Army
Filed Apr. 17, 1964, Ser. No. 364,876
1 Claim. (Cl. 29—182)

The invention described herein may be manufactured and used by or for the Government for governmental purposes without the payment to us of any royalty thereon.

This invention is a continuation-in-part of our copending patent application, Serial No. 164,631, filed January 5, 1962, and now abandoned, for "High Pressure High Temperature Filter" and assigned to the same assignee hereof.

This invention relates to a sintered metal filter and to a process of manufacture thereof. More particularly, it concerns the removal of carbonaceous and other solid particles from superheated gases or the products of combustion from a solid or liquid propellant used in missiles and the like where the temperature of the gases is between about 1675° F. and 1980° F. and under a pressure of about 4000 pounds per square inch.

The principal object of the invention is to provide a filter capable of withstanding such temperatures and pressure for a period as long as about 8 minutes.

It is known that without such a filter, valves and other moving parts clog readily and are rendered useless in less than the prescribed 8 minutes of life. The high temperature ceramic filters are unable to withstand the shock impact of a pressure wave of 4000 pounds per square inch. Further, none of the leading manufacturers of sintered metal filters had anything available to meet these requirements.

Therefore, it became imperative to the Government that a satisfactory filter be developed.

Copper and bronze filters were found incapable of holding their shape. Similarly, other metals and alloys were tried, but without success. An alloy steel, known commercially as 4690, and obtainable in powdered form, was made into a filter but found to lack the required strength properties. However, when this steel powder was screened to obtain size between −100 mesh +250 mesh, i.e., all particles being capable of passing through a 100 mesh screen and none through a 250 mesh screen, and then mixed with about 25% by weight of a lower melting metal such as copper, a very satisfactory sintered metal filter was obtained.

The 4690 steel had the following approximate composition by weight: 0.9% carbon, 0.35% silicon, 0.75% manganese, 0.010% sulphur, 0.010% phosphorous, 1.85% nickel, 0.25% molybdenum and the balance iron. About 75% of the powdered 4690 steel of −100 and +250 mesh size was mixed with about 25% by weight of copper having a particle size of about −325 mesh. In order to obtain controlled porosities, the mixed powders were sintered by the gravity or loose sintering process at a temperature of about 70° F. above the melting temperature of copper for about an hour in ways well known in the formation of filters. The reason for the one hour heating of the powdered materials reside in the fact that this was found to be a satisfactory time in order to produce a useful product whereas less time had resulted in a weak product, and heating periods greater than one hour resulted in a less desirable porosity.

Our cup-shaped filter has a cylindrical wall about ¼ of an inch thick and a substantially flat base of about the same thickness. The height of the cylindrical side wall is about 1¼ inches and the inside diameter of the cup measures about 3⅛ inches. The base of the cup has a central hole about 1.57 inches in diameter. The filter cup has an actual density of 4.80 gms./cc. to yield a porosity of about 41% when based upon a theoretical calculated density of 8.12 grams per cubic centimeter if nonporous. A tolerance of about ±5% in the weights of the steel and copper powders has been found to be permissible.

Referring now to the single figure of the drawing which illustrates an axial section through a preferred embodiment of our invention, heavy pipe 10 leads the hot unfiltered gas from a generator, not shown, and contains solid impurities to be filtered. Pipe 10 connects with a filter housing 11 containing the inverted cup-shaped filter 12 of the present invention. A fixed stem 13 has its upper end threaded for reception of a nut 14 clamping a washer 15 against the bottom of the filter 12. Nut 14 presses the edge of filter 12 against the inwardly directed flange 16 of housing 11 so that the filtered products of combustion proceed through a passageway 18 around the stem 13.

Because of the small pressure drop of only about 20 to 30 pounds per square inch through our filter, the gaseous output therefrom, now substantially free of solid impurities, can be used immediately to operate necessary machinery efficiently. Without our inventive filter, the solid carbonaceous products of combustion from a solid propellant at the stated temperatures and pressure would clog valves, pistons, and moving parts too rapidly to be used successfully.

Among the other advantages of this invention may be mentioned that for the first time, so far as is known, a highly satisfactory and inexpensive sintered metal filter has been provided from readily available powdered steels and copper by our process of manufacture requiring no elaborate equipment.

We claim:

A sintered metal filter material consisting essentially of about 75% by weight of a low carbon steel bonded with about 25% by weight of copper diffused into said steel, said filter material having a porosity of about 41%, and a density of about 4.80 gms./cc., and being capable of successfully withstanding a gas pressure of 4000 p.s.i. at 1980° F. for 8 minutes.

No references cited.

LEON D. ROSDOL, *Primary Examiner.*

R. L. GRUDZIECKI, *Assistant Examiner.*